(12) United States Patent
Richart et al.

(10) Patent No.: US 8,911,130 B2
(45) Date of Patent: Dec. 16, 2014

(54) LIGHT ENGINE FOR A FIBEROPTIC ILLUMINATOR

(71) Applicant: Sunoptic Technologies LLC, Jacksonville, FL (US)

(72) Inventors: Patrick Richart, Jacksonville Beach, FL (US); Walter Orozco, Jacksonville, FL (US)

(73) Assignee: Sunoptic Technologies, LLC, Jacksonville, FL (US)

( * ) Notice: Subject to any disclaimer, the term of this patent is extended or adjusted under 35 U.S.C. 154(b) by 0 days.

(21) Appl. No.: 13/672,284

(22) Filed: Nov. 8, 2012

(65) Prior Publication Data

US 2014/0126233 A1    May 8, 2014

(51) Int. Cl.
*F21V 7/04*    (2006.01)
*F21V 29/02*   (2006.01)
*F21K 99/00*   (2010.01)
*F21V 29/00*   (2006.01)

(52) U.S. Cl.
CPC .............. *F21K 9/52* (2013.01); *F21V 29/027* (2013.01); *F21V 29/2206* (2013.01)
USPC ............................ 362/554; 362/556; 362/581

(58) Field of Classification Search
USPC .................... 362/551, 556, 581, 554
See application file for complete search history.

(56) References Cited

U.S. PATENT DOCUMENTS

| | | | |
|---|---|---|---|
| 5,271,079 A | 12/1993 | Levinson | |
| 6,658,896 B2 | 12/2003 | Galarza | |
| 6,807,344 B2 | 10/2004 | Galarza | |
| 7,153,015 B2 | 12/2006 | Brukilacchio | |
| 7,229,201 B2 | 6/2007 | Krupa et al. | |
| 7,679,096 B1 | 3/2010 | Ruffin | |
| 7,798,692 B2 | 9/2010 | Krupa et al. | |
| 7,923,748 B2 | 4/2011 | Ruffin | |
| 7,942,562 B2 * | 5/2011 | Hatzenbuehler et al. | 362/555 |
| 7,942,563 B2 | 5/2011 | Gingrich et al. | |
| 2003/0147254 A1 * | 8/2003 | Yoneda et al. | 362/551 |
| 2004/0081423 A1 * | 4/2004 | Galarza | 385/146 |
| 2005/0286845 A1 | 12/2005 | Plocharczyk | |
| 2008/0112182 A1 * | 5/2008 | Kazakevich | 362/551 |
| 2010/0208487 A1 | 8/2010 | Li | |
| 2011/0222308 A1 | 9/2011 | Li | |
| 2013/0084044 A1 * | 4/2013 | Ertel et al. | 385/88 |

* cited by examiner

*Primary Examiner* — Evan Dzierzynski
(74) *Attorney, Agent, or Firm* — Howson & Howson LLP

(57) ABSTRACT

A light engine for a fiberoptic illuminator is disclosed. The light engine has a light emitting diode (LED) and collimating optics for gathering, transmitting and focusing light emitted from the LED. The collimating optics is provided by a fused fiberoptic rod having an outer glass cladding which provides a seal for a bundle of optic fibers drawn and tightly packed and fused together. The fused fiberoptic rod has an elongate cylindrical distal end and a frustoconical proximal end forming a fused tapered tip. The fused tapered tip having a proximal end face disposed adjacent the LED for receiving light emitted by the LED.

17 Claims, 2 Drawing Sheets

LIGHT ENGINE FOR A FIBEROPTIC ILLUMINATOR

BACKGROUND

A fiberoptic illuminator, or light source, is provided for introducing a high intensity light beam into an end of a separate fiber optic bundle, or cable, and more particularly, a light engine for a fiberoptic illuminator is provided.

Fiberoptic illuminators and like light sources typically include a lamp or the like within a housing and a jack or port providing a fiber optic cable interface that permits an end fitment or termination of a fiber optic bundle or cable to be connected to the housing. The lamp supplies a light beam into the end of the fiber optic cable, and the cable transmits the light to an endoscope, headlamp, or like medical/surgical device tethered to the illuminator.

SUMMARY

According to embodiments disclosed herein, a light engine for a fiberoptic illuminator has a light emitting diode (LED) as a means for emitting light and collimating optics as a means for gathering, transmitting and focusing the light. The collimating optics is provided as a fused fiberoptic rod having an outer glass cladding which provides a seal for a bundle of elongate optic fibers drawn and tightly packed and fused together. The fused fiberoptic rod has an elongate cylindrical end and a frustoconical end forming a fused tapered tip. The fused tapered tip serves as the proximal face disposed adjacent the LED for receiving light emitted by the LED into the fused fiberoptic rod.

BRIEF DESCRIPTION OF THE DRAWINGS

The features and advantages of embodiments disclosed herein should become apparent from the following description when taken in conjunction with the accompanying drawings, in which.

DETAILED DESCRIPTION

Figure 1:
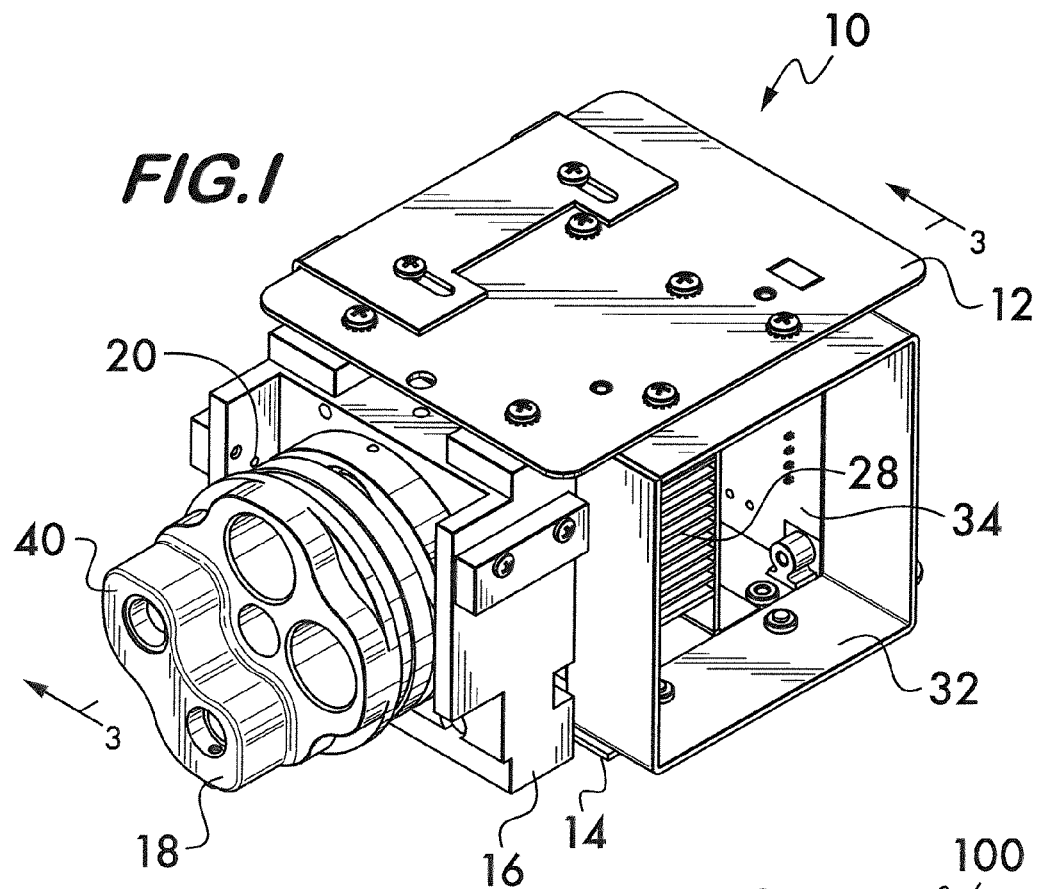
FIG. 1 is a perspective view of a light engine of a fiberoptic illuminator having a first arrangement of parts according to an embodiment.

A first embodiment of a light engine 10 for use in forming a fiberoptic illuminator, or light source, is shown in FIG. 1. Although not otherwise shown in the drawings, a fiberoptic illuminator will typically include an exterior housing or enclosure in which the light engine, such as light engine 10, is contained and mounted. The enclosure is typically of a generally-rectangular, box-shaped configuration. Of course, other housing shapes and configurations can be utilized and may be provided in a manner such that the illuminator is of a relatively small size occupying only a relatively small amount of space in an operating room or like environment.

According to at least some embodiments, the fiberoptic illuminator constructed with the light engine 10 provides a source of light of great intensity, operates at low noise, is able to accommodate internal heat management issues, is able to prevent heat-related damage to the ends of fiber optic cables, and permits a turret or like cable interface to remain no more than warm to the touch after hours of continuous operation of the illuminator.

Figure 3:
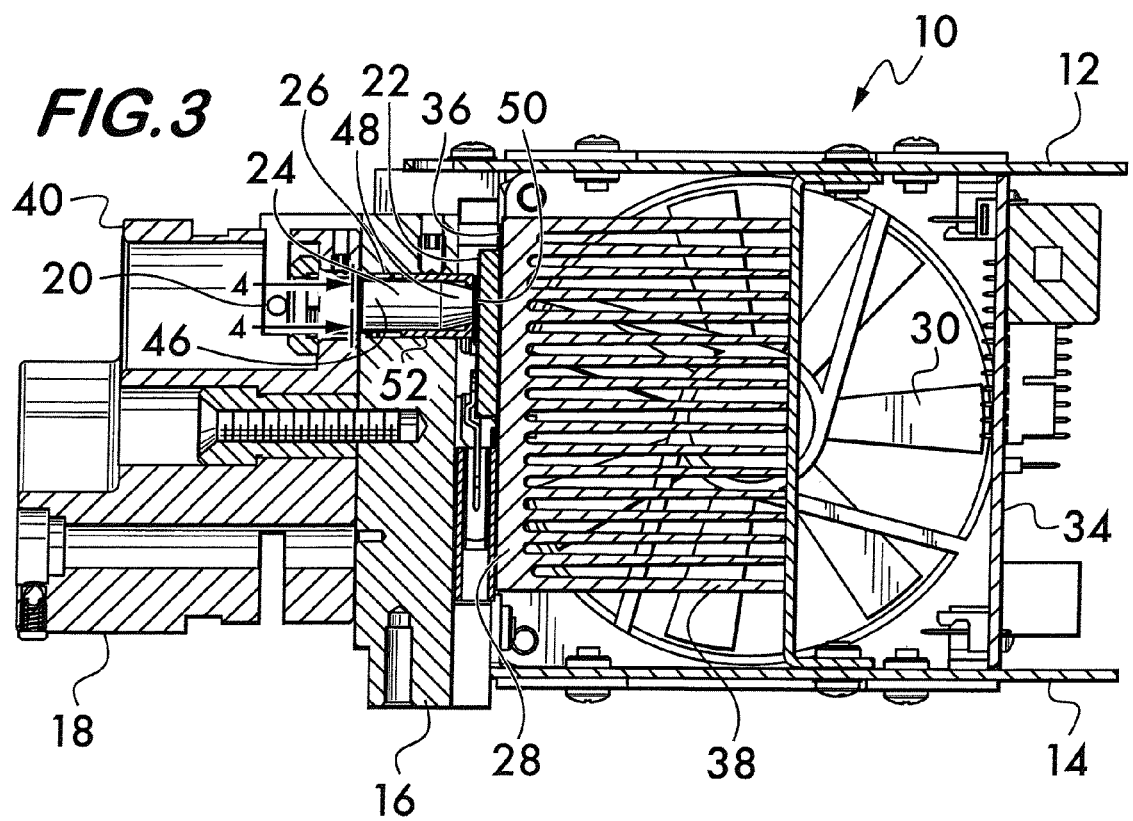
FIG. 3 is a cross-sectional view of the light engine having the first arrangement of parts taken along line 3-3 of FIG. 1.

The light engine 10 shown in FIG. 1 having a cross-section as shown in FIG. 3 can include an assembly of various components including, but not limited to: opposed plates 12 and 14 which may provide part of the ducting structure of a fiberoptic illuminator and may also provide points of attachment for other components; a front block 16 which may be made of aluminum and may be used to mount various components together; a fiber optic cable endtip interface 18; a pair of sensors 20 (i.e., send and receive) on opposed sides of the interface 18 for detecting the presence of a fiber optic cable endtip interface 18; an electronic chip 22 having a light emitting diode (LED); collimating optics 24 provided by an optical rod made of a bundle of fused optic fibers and having a fused tapered end; a spring 26 for holding the optical rod 24 in position; a heatsink 28; a fan 30; a nozzle 32; and a driverboard 34.

By way of example, the LED chip 22 of light engine 10 may provide a single high output LED for generating white light. Alternatively, the LED chip 22 may be in the forte of an array of LEDs and/or chips, such as a 2×2 array of LEDs, an array of LEDs arranged circumferentially around a central LED, an array of LEDs of different colors, typically red, green, blue, and/or white that can be individually addressed to mix colors. The light from the single LED or array of LEDs can be used for endoscopy, video systems, and microscopy applications as well as other applications. A cable connected to the light engine 10 via the interface 18 may transmit the light generated by the single LED or an array of LEDs to an endoscope, headlamp, or like medical/surgical device tethered to the illuminator via the cable. By way solely for example, the LED or LEDs may provide light output of 1900 lumens with minimum 1300 lumens into a 5 mm aperture at 0.66NA, may have a Correlated Color Temperature (CCT) equal to 7000K Nominal, may have a Color Rendering Index (CRI) equal to 79 Nominal, and may have a lifetime estimated at 30,000 hours. Other light output characteristics can also be utilized depending upon the application.

As best illustrated in FIG. 3, the LED chip 22 is mounted directly on a front face 36 of the heatsink 28 for thermal management purposes. Accordingly, as the LED or an array of LEDs generate heat during use, the heat can be transferred to the heatsink 28 thereby providing a means for dissipating the heat generated by the LED chip 22.

As shown in FIG. 3, the heatsink 28 is mounted between the opposed plates 12 and 14 and has a series of spaced-apart fins 38 through which ambient air may flow for purposes of transferring or exchanging the heat from the fins 38 to the flowing air. Thus, fan 30 is mounted to the opposed plates 12 and 14 on a side of the heatsink 28 to direct a flow of ambient air transversely through the passages extending between the fins 38 of the heatsink 28 and then through the nozzle 32 mounted to the opposed plates 12 and 14 opposite the fan 30 to direct the flow of air heated by the fins 38 away from the light engine 10.

The aluminum block 16 is mounted to the plate 12 in front of the heatsink 28 and directly to the heatsink 28 via thermal insulating standoffs (not shown). Thus, the aluminum block 16 is located directly in front of the LED chip 22 and has an open channel in alignment with the LED and/or array of LEDs. The collimating optics 24 is positioned within this channel and may be held in place against the LED or an array of LEDs via the spring 28 or the like so that the optics 24 are in proper position to receive light generated by the LED or an array of LEDs.

The fiber optic cable endtip interface 18 is connected to the aluminum block 16 opposite the LED chip 22 and provides a means of coupling fiber optic cable endtips or terminations to the light engine 10 via an optically isolated interface. The endtip interface 18 of the light engine 10 shown in FIG. 1 is provided in the form of a four-port turret 40 which is rotatably mounted to the aluminum block 16 such that any of the four differently sized and or shaped ports of the turret 40 can be aligned with the collimating optics 24 via rotation of the turret 40. The turret 40 permits the light engine to accommodate a variety of different standard and/or non-standard fiberoptic cable endtips and terminations. The aluminum block 16 may carry one or more sensors or sensor pairs 20 (such as one sensor for sending a signal and another for receiving a signal) for detecting the presence and/or absence of a fiber optic cable endtip within one of the ports of the interface 18.

The driver circuits for the light engine 10, such as constant current LED drive electronics, are provided on the driverboard 34 which is mounted between the opposed plates 12 and 14 at an end of the light engine 10 opposite the interface 18 as shown in FIG. 3. The circuits on the driverboard 34 may handle high level commands, for instance, complete intensity control of the LED, fixed or user configurable LED current to the LED chip 22, monitoring of LED and other electronic component temperatures for thermal management, fan speed feedback and control, sensor information such as detection of presence/absence of endtip in port, fault reporting, usage history, high frequency PWM dimming up to 32 kHz to eliminate video flicker, and arbitrary dimming waveforms for video synchronization or timing light applications. An additional circuit board (not shown) may provide low level control of the light engine 10 while providing a high level UART, RS-232, or USB command interface. The additional control board may be provided as part of the engine package or may be created by end users using a part of their own equipment. The light engine chassis may be electrically isolated and may be referenced to an application chassis.

Figure 2:
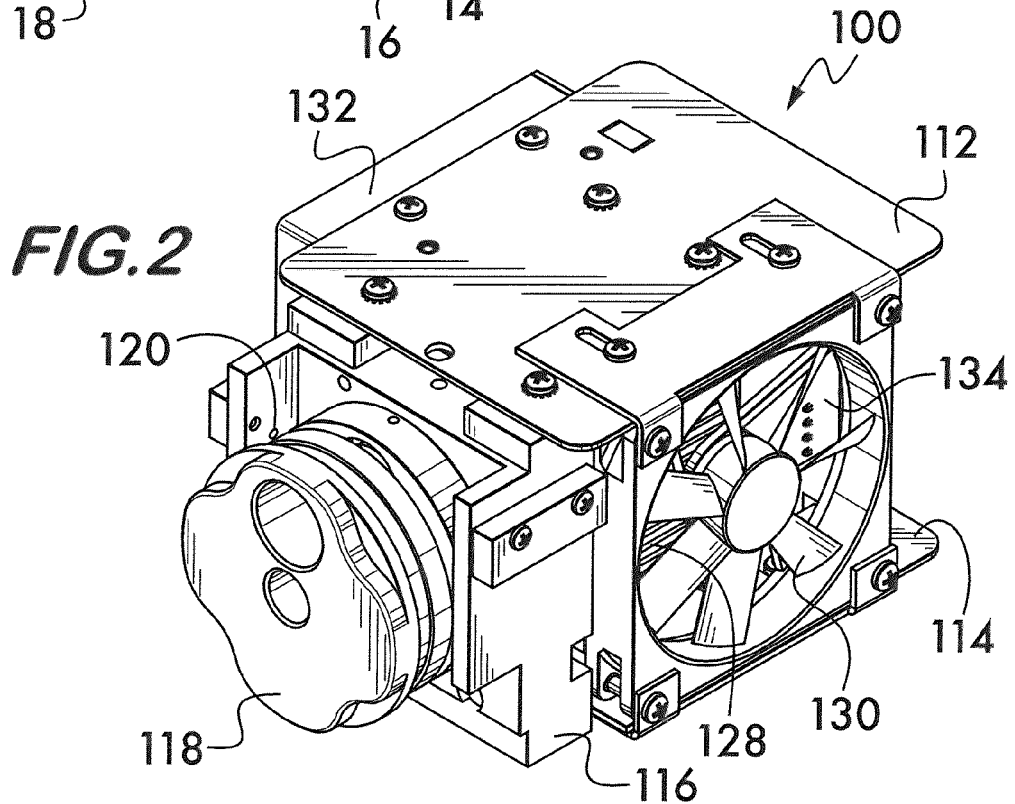
FIG. 2 is a perspective view of a light engine of a fiberoptic illuminator having an alternate arrangement of parts according to an embodiment.

As described above, the light engine 10 has a modular construction which can be readily altered to accommodate different arrangements of components, wiring harnesses, special ducting, or any number of parts or arrangements thereof that affect the several components of the light engine as may be desired. By way of example, an alternate embodiment of a light engine 100 is shown in FIG. 2.

Similar to the light engine 10, the light engine 100 includes opposed plates 112 and 114; a front block 116 which may be made of aluminum; a fiber optic cable endtip interface 118; one or more sensors or pairs of sensors 120 for detecting the presence of a fiber optic cable endtip; an electronic chip having a LED (not shown); collimating optics (not shown); a heatsink 128; a fan 130; a nozzle 132; and a driverboard 134. These components perform the same functions as discussed above with respect to the light engine 10. However, the light engine 100 demonstrates how certain changes can be readily made to the light engine 10 due to the modular construction and assembly of the light engines, 10 and 100.

For example, the fan 30 in the light engine 10 is shown mounted to the left of the heatsink 28; whereas, the fan 130 in the light engine 100 is mounted to the right of the heatsink 128. Thus, the modular construction permits left or right alignment of the cooling fan relative to the heatsink. In addition, the turret 40 of light engine 10 has been replaced on light engine 100 with a single port body 118 accepting a particular type of fiber optic cable end fitting. With this type of port body, the port body 118 does not need to rotate relative to the aluminum block 116.

Implementing either of the light engines 10 or 100 can be accomplished by connecting a single potentiometer to the driverboard or by connecting a more powerful controller which may provide complete digital control of the LED and access to all on-board sensors.

Figure 4:
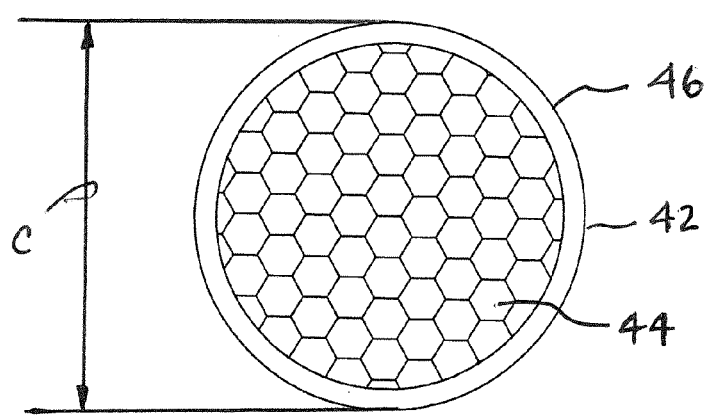
FIG. 4 is a cross-sectional view of a fused rod of the light engine having the first arrangement of parts taken along line 4-4 of FIG. 3.

The collimating optics 24 of the light engine 10 is best shown in FIGS. 3 and 4. The collimating optics 24 is made of a fused fiber optic rod within a glass cladding 42 which is contained within a brass housing 52 and which extends through the aluminum block 16. The use of a fused rod enables a packing fraction of a bundle of optic fibers 44 (see FIG. 4) within the cladding 42 to be over 90% which permits the rod to transmit considerably more light than other types of light guides from a proximal end face to a distal end face. As best shown in FIG. 4, the individual fiber optic elements within the bundle assume a hexagonal shape when compressed during the fusing process.

The fused rod 24 has a circular outer periphery and a substantially constant diameter "C" throughout its cylindrical distal end 46. However, a proximal end 48 of the fused rod which extends adjacent the LED or LEDs is tapered to form a frustoconical fused tapered tip. As used herein, the words proximal and distal are used in respect to locations relative to the LED or LEDs. Thus, the proximal end 48 is closest to the LED or LEDs and the distal end 46 is further away from the LED or LEDs. The proximal end 48 tapers inwardly to a proximal end face 50 in contact with, or closely adjacent, the LED. The proximal end face 50 has a smaller diameter than the opposite distal end face of the rod, and each of the optic fibers 44 extends continuously from the proximal end face 50 to the distal end face; however, within the tapered tip, the optic fibers are drawn to narrower diameters.

With elongate fiber optic elements, it is known that fibers within a bundle of optic fibers, have a limited acceptance aperture, or angle, and that much light is reflected or passes through a receiving face of the elements and then through longitudinally-extending walls of the elements and may be lost rather than reflecting internally to ultimately exit at the opposite end face. However, a fused taper as described above for distal end 48 of fused rod 24 provides unique properties that are of particular value in the light engines 10 and 100 described above.

For instance, a fused taper (i.e., a taper formed of fused (drawn) optic fibers) has a larger effective angle of acceptance than a standard taper made from the same materials (i.e., non-fused (non-drawn) fibers or a single glass core). This is due to the fact that, within the fused taper, the axes of the perimeter fiber optic elements are angled away from the axis of the center elements as a result of the tapering process. Thus light entering a central element at an angle greater than that element's acceptance angle and passing out through the side wall of that element will be captured by a perimeter fiber optic element if it falls within the perimeter fiber optic element's local acceptance angle. Consequently, a fused tapered element gathers more light because of an effect of angling the elements around the periphery into closer alignment with the light that would normally be outside the acceptance angle of the element were it aligned with the axis of the larger diameter fused rod. Additionally, as each cell, or element, of the taper has a high length to diameter ratio, the fused taper allows it to make the angular distribution modification in a shorter length than is possible with a plain taper. Thus, the overall length of the optics can be reduced for use in smaller packages and light engines.

Thus, the fused and tapered distal end 48 of the fused rod 24 is able to gather, conduct and focus as much useable light as possible emitted by a single LED or an array of LEDs to the fiber optic cable endtip and provides superior gathering and delivery of light from the LED or LEDs.

In producing the fused rod 24, a bundle of closely-packed, elongate optic fibers 44 is inserted into the hollow glass cladding 42. The cladding 42 and optic fibers 44 are heated and drawn to fuse the bundle of optic fibers together and to seal the bundle of optic fibers within the cladding thereby forming an elongate fused fiberoptic rod. The drawing process step provides a high packing fraction and enables the rod to transmit considerably more light than is possible with the pre-drawn assembly. An end of the fused rod can be heated and stretched to form the fused tapered distal end tip. A diamond jig or the like can be utilized to grind and polish the opposite ends of the fused rod to ensure maximum light transmission therethrough.

While preferred embodiments of light engines for fiberoptic illuminators have been described in detail, various modifications, alternations, and changes may be made without departing from the spirit and scope of the light engines according to the present invention as defined in the appended claims.

We claim:

1. A light engine for a fiberoptic illuminator, comprising:
a light emitting diode (LED);
collimating optics adjacent said LED for gathering, transmitting and focusing light emitted from the LED through a distal end face of the collimating optics;
an interface having at least one port into which an endtip of a separate fiber optic cable is receivable for purposes of receiving light projecting through said distal end face of the collimating optics; and
a front block having a channel in which the collimating optics are mounted and a front face to which said interface is attached;
said collimating optics being an optic rod having an elongate cylindrical distal end and a frustoconical proximal end forming a tapered tip, said tapered tip having a proximal end face positioned adjacent said LED for receiving light emitted by the LED into the optic rod; and
said interface being a turret that has a plurality of different shaped or sized ports and that is rotatable relative to said front block.

2. The light engine according to claim 1, wherein the LED is provided in the faun of a single light-emitting LED or an array of LEDs on at least one electronic chip.

3. The light engine according to claim 2, wherein said at least one electronic chip abuts a heatsink having a plurality of rearward extending fins.

4. The light engine according to claim 3, further comprising a fan and a nozzle on opposed sides of said heatsink to direct a flow of air through openings between said fins to dissipate heat from said at least one electronic chip and heatsink.

5. The light engine according to claim 4, wherein the light engine is of modular construction permitting the interface to be removed and replaced with a different interface and permitting the locations of the fan and nozzle to be interchanged.

6. The light engine according to claim 1, wherein the optic rod is a fused fiberoptic rod produced by a process in which a bundle of closely-packed, elongate, optic fibers is inserted into a hollow glass cladding and heated and drawn to fuse the bundle of optic fibers together and to seal the bundle of optic fibers within the cladding to provide a high packing fraction of optic fibers and in which the proximal end of the fused fiberoptic rod is subject to further heating and drawing to form the fused tapered proximal end tip such that each optic fiber within said bundle extends continuously from the distal end face to the proximal end face of the fused fiberoptic rod, and wherein each of said optic fibers is hexagonal in transverse cross-section after being fused together.

7. The light engine according to claim 1, wherein said optic rod has outer cladding.

8. A light engine for a fiberoptic illuminator, comprising:
a light emitting diode (LED);
collimating optics adjacent said LED for gathering, transmitting and focusing light emitted from the LED through a distal end face of the collimating optics, said collimating optics being an optic rod having an elongate cylindrical distal end and a frustoconical proximal end forming a tapered tip, said tapered tip having a proximal end face positioned adjacent said LED for receiving light emitted by the LED into the optic rod;
an interface having at least one port into which an endtip of a separate fiber optic cable is receivable for purposes of receiving light projecting through said distal end face of the collimating optics;
a front block having a channel in which the collimating optics are mounted and a front face to which said interface is attached; and
at least one sensor or pair of sensors mounted on said front block to detect one of a presence and an absence of an endtip within said interface.

9. The light engine according to claim 8, wherein said front block is made of aluminum.

10. A light engine for a fiberoptic illuminator, comprising:
a light emitting diode (LED) on an electronic chip;
collimating optics adjacent said LED for gathering, transmitting and focusing light emitted from the LED through a distal end face of the collimating optics, said collimating optics being an optic rod having an elongate cylindrical distal end and a frustoconical proximal end forming a tapered tip, said tapered tip having a proximal end face positioned adjacent said LED for receiving light emitted by the LED into the optic rod;
an interface having at least one port into which an endtip of a separate fiber optic cable is receivable for purposes of receiving light projecting through said distal end face of the collimating optics;
a front block having a channel in which the collimating optics are mounted and a front face to which said interface is attached;
a heatsink abutting the electronic chip and having a plurality of rearward extending fins;
a fan and a nozzle on opposed sides of said heatsink for directing a flow of air through openings between said fins to dissipate heat from the electronic chip and heatsink; and
opposed plates which interconnect with said front block, said heatsink, said fan, said nozzle, and a driverboard carrying LED driver circuitry.

11. The light engine according to claim 10, wherein said interface is a turret that has a plurality of different shaped or sized ports and that is rotatable relative to said front block.

12. A fiberoptic illuminator, comprising a light engine, said light engine comprising:
at least one light-emitting diode (LED);
collimating optics for gathering, transmitting and focusing light emitted from the at least one LED, said collimating optics being an optic rod having outer cladding, an elongate cylindrical distal end, and a frustoconical proximal end forming a tapered tip, said tapered tip having a proximal end face disposed adjacent said LED for receiving light emitted by the LED and said elongate cylindrical distal end having a distal end face through which the light is projected; and an interface having at least one port into which an endtip of a separate fiber optic cable is receivable for purposes of receiving light projecting through said distal end face of the collimating optics; and a front block having a channel in which the collimating optics are mounted and a front face to which said interface is attached;

said interface being a turret that has a plurality of different shaped or sized ports and that is rotatable relative to said front block.

13. The fiberoptic illuminator according to claim 12, wherein the at least one LED is disposed adjacent a heatsink having a plurality of rearward-extending fins.

14. The fiberoptic illuminator according to claim 13, further comprising a fan and a nozzle mounted on opposite sides of said heatsink to direct a flow of cooling air through openings between said fins.

15. The fiberoptic illuminator according to claim 14, further comprising opposed plates to which said front block, said heatsink, said fan, said nozzle, and a driverboard carrying LED driver circuitry are interconnected.

16. The fiberoptic illuminator according to claim 12, further comprising at least one sensor mounted on said front block to detect one of a presence and an absence of an endtip within said interface.

17. The fiberoptic illuminator according to claim 12, wherein said optic rod is a fused fiberoptic rod having outer cladding providing a seal for a bundle of optic fibers drawn and fused together, each of the optic fibers within the bundle extending continuously from the proximal end face to the distal end face of said optic rod and being of a hexagonal shape in transverse cross-section.

* * * * *

UNITED STATES PATENT AND TRADEMARK OFFICE
CERTIFICATE OF CORRECTION

PATENT NO. : 8,911,130 B2
APPLICATION NO. : 13/672284
DATED : December 16, 2014
INVENTOR(S) : Patrick Richart et al.

It is certified that error appears in the above-identified patent and that said Letters Patent is hereby corrected as shown below:

In the Specification

Column 2, line 25, "forte" should read "form"

In the Claims

Column 5, line 48, "faun" should read "form"

Signed and Sealed this
Fifth Day of May, 2015

Michelle K. Lee
*Director of the United States Patent and Trademark Office*